April 27, 1937.                E. RÜDIGER                2,078,812
                              WEIGHING SCALE
                    Filed Jan. 24, 1936           2 Sheets—Sheet 2

Patented Apr. 27, 1937

2,078,812

UNITED STATES PATENT OFFICE 2,078,812

WEIGHING SCALE

Ernst Rüdiger, Berlin, Germany

Application January 24, 1936, Serial No. 60,724
In Germany February 13, 1935

8 Claims. (Cl. 265—61)

The invention relates to an automatic weighing machine which is intended primarily for domestic use but which due to its particularly convenient form is also suitable for office use and like purposes. The load pan is disposed above the counter balance for the load and particularly efficient arrangements are provided for weighing small quantities and large quantities.

In the known machines of this kind, purely spring balances have been used almost exclusively for weighing small quantities and large quantities and in this connection they do not give the desired accuracy for weighing small quantities.

Consequently, according to the invention, the weighing of small quantities is effected by a pendulum weight balance without loose weights and after passing through this precision range, a spring balance becomes operative. This affords a most advantageous construction for weighing machines of this kind, the load being counterbalanced by the pendulum weight in the precision range and by the usual balance springs in the main range.

To attain the desired object, one of the links of the load pan is constructed as an arm of a pendulum lever which at the same time carries an indicating member which can be read through a window in the housing, and the balance springs which are not loaded until the precision range has been passed are, on the one hand, held in vertical threaded sleeves adjustable by adjusting screws and, on the other hand, have elongated eyes in which the lateral arms of the load pan support slide to the point of working engagement. This construction gives an extremely simple and useful weighing machine in very compact and convenient form and a most easy and rapid adjustment of the main balance springs is possible.

The load pan can have any suitable form. For domestic purposes it may be constructed as a measuring vessel, thus further increasing the utility of the machine.

By the novel combination of pendulum weight balance without loose weights with a spring balance, which has not hitherto been proposed in this connection, a weighing machine is obtained which is very sensitive in the precision range so that it can be employed as a letter balance, while in the rain range it has at least the accuracy of known machines and due to its compact construction, with the absence of sharp abutments on the housing, it is superior in every way to the known arrangements intended for the same purpose.

One embodiment of the invention is shown by way of example in the accompanying drawings in which Fig. 1 is a side view of the weighing machine with the housing partly broken away.

Fig. 3 is a fragmentary perspective detail of the scale slate.

Figure 1:
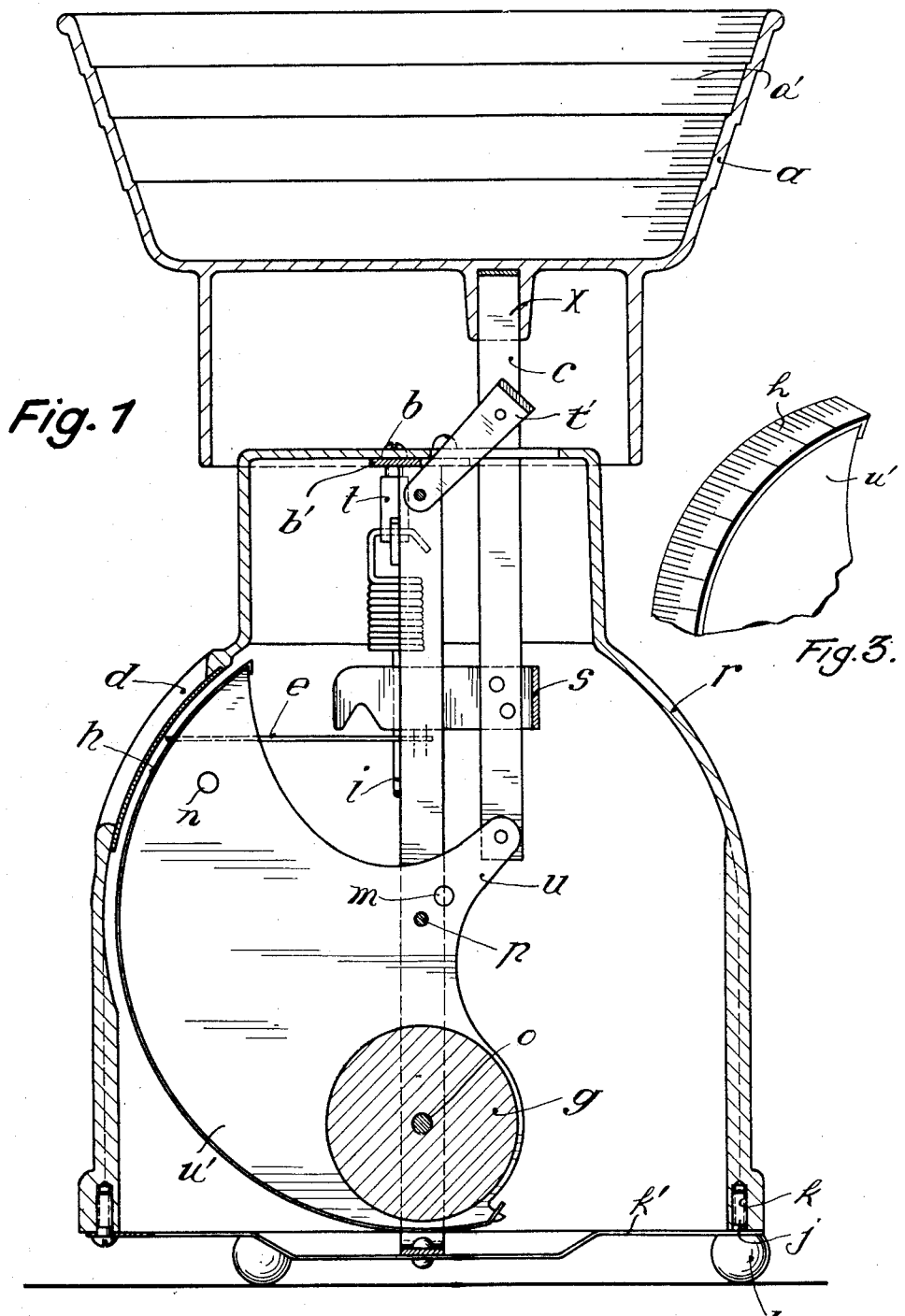
Figure 2:
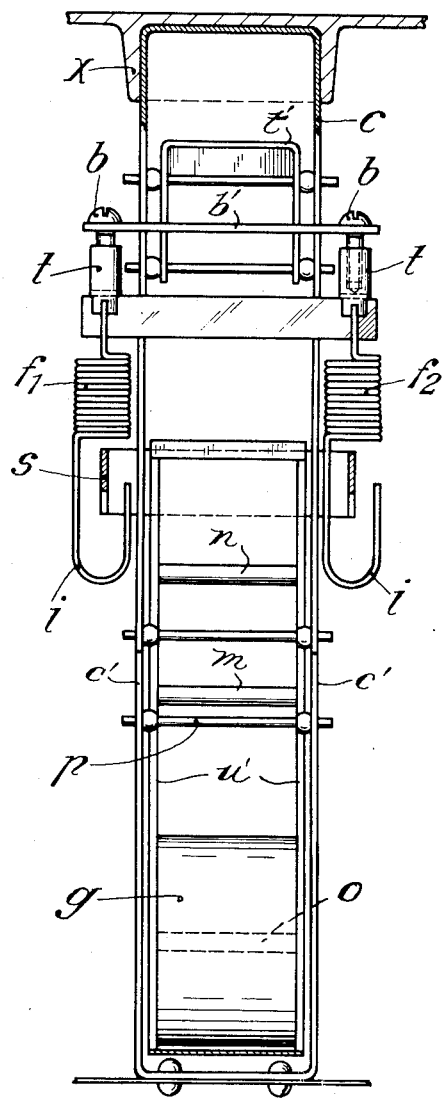
Fig. 2 is a view at right angles to Fig. 1.

Referring to the drawings there is provided a precision weighing device including a load pan $a$, which is provided with measuring graduations $a'$ and is removably seated upon a load pan carrier $c$ which enters a pocket $x$ formed on the underside of said pan. A pair of fixed upright standards $c'$ are connected to $c$ by means of a U-shaped link member $t'$.

Suitable lost motion connection means is now associated with the load pan carrier $c$ and includes a transverse catch member $s$ affixed adjacent the bottom of the load pan carrier, said catch member having catch arms projecting on both sides into the eyes $i$ of the springs $f_1$ and $f_2$ of a main weighing device which are arranged to balance comparatively heavy weights. Said springs are held by adjustable screws $b$ which engage in vertical threaded sleeves $t$ and a bridge piece or crossbar $b'$ secured to the housing $r$. The housing has a rounded contour and a series of vertical threaded holes $k$ extending upwards from its bottom edge. A base plate $k'$ is provided for the housing and supports the standards $c'$ being secured to the lower edge of the housing by screws $j$, one of which carries a foot member $l$ so as to support said housing at a predetermined and variable level. The two lower ends of the load pan carrier $c$ operate directly on the arms $u$ of an arcuately shaped pendulum lever $u'$, said arms constituting the supporting links for the load pan carrier. The pendulum lever at its lower end carries a weight $g$ and a scale $h$. The lever $u'$ pivots about the axis $p$ journaled in the standards $c'$. The lever $u'$ includes two segmental sections held in suitable spaced relation by bars $m$, $n$, and $o$, while fixed to the outer curved edges of the sections is the indicating plate $h$ which is arcuate to conform to the outer curved edges of the segmental sections of the lever $u'$.

The indicia on the scale plate are visible through a window $d$ in the housing and are read with the aid of a resilient metal yoke $e$ which acts as a visor or pointer to indicate the zero position of the scale. The pendulum lever $u'$ moves between the two springs $f_1$ and $f_2$ and the two arms or movable levers of the load pan carrier $c$.

When a load is placed on the machine the transverse catch member $s$ which moves downwardly together with the carrier $c$ over the load pan comes into engagement with the lower edge of the elongated eyes $i$ of the springs $f_1$ and $f_2$ after traversing the precision range. As indicated above, the point of suspension of these springs can be altered by means of the screws $b$ which are adjustable in vertical threaded sleeves $t$ so that at a predetermined point in the deflection of the pendulum lever the main weighing springs $f_1$ and $f_2$ also come into operation to balance the load. The adjusting foot $l$ serves for the correct adjustment of the weighing machine. A particular advantage of the weighing machine according to the invention is that its construction makes it possible to accommodate all the operative elements in a vase-shaped vessel which can readily be cleaned and thus affords technical advantages and in addition is very satisfying in aesthetic respects. The new weighing machine affords the possibility of weighing small quantities with much greater precision than hitherto and at the same time is superior in every way to the known constructions.

It is to be noted that the arms of the link member $t'$ and the arms $u$ of the pendulum lever serve as coupling links between the fixed lever or standards $c'$ and the movable lever or load carrier $c$.

I claim:—

1. A weighing scale including in combination, a precision weighing device comprising a pendulum weight balance arranged to balance weight applied thereto within a predetermined maximum limit, a main weighing device comprising a spring balance arranged to balance weight applied thereto in excess of said limit, and means for automatically transferring the balance of said applied weight from said pendulum weight balance to said spring balance.

2. A weighing scale including in combination, a movable load-receiving member, a pendulum weight balance arranged to balance weight applied to said load-receiving member within a predetermined maximum limit, means for operatively connecting said load-receiving member to said pendulum weight balance, a spring balance arranged to balance weight applied to said load-receiving member in excess of said limit, and a lost motion connection between said load-receiving member and said spring balance so that the balance of the weight applied above said limit is automatically transferred from said pendulum weight balance to said spring balance.

3. A weighing scale including a parallel link motion having a fixed lever, a movable lever, and at least two links serving to couple said levers, one of said links being loaded to form a pendulum weight balance, a load-receiving pan mounted upon said movable lever, a spring balance fixedly positioned in relation to said fixed lever, at least one slotted projection extending from said spring balance, and a catch arm extending from said movable lever to engage said slotted projection to effect a lost motion connection therebetween so that said spring balance operates to balance the load placed upon said weight receiving member when said load exceeds a predetermined limit.

4. A weighing apparatus including in combination, a casing structure, a parallel link motion contained in said casing and having a substantially vertical fixed lever, a movable lever and at least two pivotal links connecting said levers, one of said links being in the form of an arcuate plate, a load-receiving member supported by said movable lever, a weight attached to said arcuate plate to form a pendulum weight balance within limits determined by said weight, a spring balance anchored to said casing adjacent said link motion, at least one slotted connecting member projecting from said spring balance, at least one catch arm rigidly secured to said movable lever and arranged to project through said slotted connecting member and effect a lost motion connection therebetween so that said spring balance operates to balance the load placed upon said load-receiving member when said load exceeds a predetermined limit.

5. A weighing apparatus as claimed in claim 4, in which the casing is formed with a viewing window, and the combination includes a graduated index mounted upon said arcuate link member so as to move past said viewing window in the rotation of said arcuate link member, and a fixed pointer arranged adjacent the path of said graduated index so as to be visible through said window to indicate the degree of rotation of said arcuate link member according to the amount of the load placed upon said load-receiving member.

6. A weighing apparatus including in combination, a casing structure, a parallel link motion contained in said casing and comprising a pair of substantially vertical fixed levers, a pair of substantially vertical movable levers, a bridge piece secured to said casing, upper and lower link members connecting said fixed levers to said movable levers, one of said link members having its limbs in the form of arcuate sections, load balancing weights secured to said sections, a load-receiving member mounted upon the upper extremities of said movable levers, a pair of load balancing springs anchored to said casing and extending in vertical direction in proximity to said levers, said springs each being provided with hook shaped projections, and catch arms secured to said movable levers and projecting into the hooks of said springs to form a lost motion connection therewith so that the balance of the load placed upon said load-receiving member is transferred from said pendulum weight balances to said spring balances when said load exceeds a predetermined limit.

7. A weighing apparatus as claimed in claim 4, in which the spring balance includes a bridge piece secured to said casing, at least one helical tensile spring, a threaded sleeve secured to the upper extremity of said spring, a screw passing through said bridge piece to engage said threaded sleeve adjustably to secure said spring to said bridge piece, and a hooked projection extending downwardly from said spring to receive said catch arm.

8. A weighing apparatus including in combination, a casing having a viewing aperture therein, an upward extension of said casing provided with a clearance in its upper wall, a pair of spaced vertical levers bridged at their lower extremities and secured within said casing to the bottom thereof, a pair of vertical movable levers partially positioned in said casing in parallel alignment with said fixed levers, the upper extremities of said movable levers being bridged and passing upwardly through the clearance in said casing extension, a load-receiving pan having a pocket located upon its underside freely to receive the upper bridged extremities of said movable levers, a skirt extending downwards from said pan freely to embrace said upward extension of said casing, a pair of U-shaped links pivotally secured to the opposed inner faces of said fixed levers and movable levers, the limbs of the lower link being in the form of arcuate plates the curved edge of which passes across the viewing aperture in said casing, a yoke loosely embracing said arcuate plates to form a visor and fixed so as to be visible through said viewing window, a graduated index secured to said plates so as to be visible through said window to indicate in combination with said visor the weight applied to said pan, a weight attached to said arcuate plates to form a pendulum balance which balances within predetermined limits the load applied to said load pan, a spring balance device secured within said casing, a lost motion connection between said spring balance device and said movable levers by which the balance of a load placed upon said pan in excess of said limit is transferred from said pendulum balance to said spring balance, and means for adjusting the position of said spring balance for the purpose set forth.

ERNST RÜDIGER.